United States Patent [19]
Masuyama et al.

[11] Patent Number: 6,013,709
[45] Date of Patent: Jan. 11, 2000

[54] POLYSTYRENIC RESIN COMPOSITION AND MOLDED ARTICLE THEREOF

[75] Inventors: Akitoshi Masuyama; Hiroki Fukui; Akihiko Okada, all of Ichihara, Japan

[73] Assignee: Idemitsu Petrochemical Co., Ltd., Tokyo, Japan

[21] Appl. No.: 08/776,183

[22] PCT Filed: May 20, 1996

[86] PCT No.: PCT/JP96/01329

§ 371 Date: Jan. 24, 1997

§ 102(e) Date: Jan. 24, 1997

[87] PCT Pub. No.: WO96/37552

PCT Pub. Date: Nov. 28, 1996

[30] Foreign Application Priority Data

May 26, 1995 [JP] Japan ................................. 7-127724

[51] Int. Cl.$^7$ ................. C08J 5/21; C08J 5/36; C08J 3/10
[52] U.S. Cl. ............ 524/224; 524/282; 524/291; 524/398; 524/413
[58] Field of Search .................. 524/398, 413, 524/291, 224, 282

[56] References Cited

U.S. PATENT DOCUMENTS

| | | |
|---|---|---|
| 5,089,353 | 2/1992 | Negi et al. . |
| 5,109,068 | 4/1992 | Yamasaki et al. . |
| 5,127,158 | 7/1992 | Nakano . |
| 5,166,238 | 11/1992 | Nakano et al. . |
| 5,200,454 | 4/1993 | Nakano et al. . |
| 5,219,940 | 6/1993 | Nakano et al. . |
| 5,270,353 | 12/1993 | Nakano et al. . |
| 5,326,813 | 7/1994 | Okada et al. . |
| 5,346,950 | 9/1994 | Negi et al. . |
| 5,352,727 | 10/1994 | Okada . |
| 5,391,611 | 2/1995 | Funayama et al. . |
| 5,391,626 | 2/1995 | Machida et al. ................ 525/242 |
| 5,418,275 | 5/1995 | Okada et al. . |
| 5,436,397 | 7/1995 | Okada . |
| 5,444,126 | 8/1995 | Okada et al. . |
| 5,476,899 | 12/1995 | Funaki et al. ................ 542/577 |
| 5,543,462 | 8/1996 | Okada et al. . |

*Primary Examiner*—Peter D. Mulcahy
*Attorney, Agent, or Firm*—Oblon, Spivak, McClelland, Maier & Neustadt, P.C.

[57] ABSTRACT

A polystyrenic resin composition comprising (A) a styrenic polymer composition containing (a) 1 to 99% by weight of a polystyrenic resin having the syndiotactic configuration, (b) 1 to 99% by weight of a polyamide resin, (c) 0.1 to 10% by weight of a compatibilizer which is compatible with component (a) and has a polar group reactive with component (b), and (d) 0 to 50% by weight of a rubbery elastomer and/or a modified rubbery elastomer, (B) specific amounts of a copper compound and an iodine compound, and optionally, specific amounts of (C) a phenolic compound, (D) N,N'-hexamethylenebis(3,5-di-t-butyl-4-hydroxyhydrocinnamide), (E) an ester of thiodipropionic acid or a derivative thereof, (F) a copper inhibitor, and (G) inorganic filler; and a molded article prepared from the polystyrenic resin composition.

The polystyrenic resin composition shows excellent resistance to heat aging so that little change in physical properties or color is caused even after exposure to a high temperature for a long time, has excellent toughness, rigidity, heat resistance, and water resistance, and can advantageously be used as a material for various types of industrial product.

18 Claims, No Drawings

POLYSTYRENIC RESIN COMPOSITION AND MOLDED ARTICLE THEREOF

TECHNICAL FIELD

The present invention relates to a polystyrenic resin composition and a molded article thereof. More particularly, the present invention relates to a polystyrenic resin composition which can advantageously be used as a material for industrial products, such as electric and electronic parts, industrial structural materials, automotive parts, electric appliances, and various types of mechanical parts, has excellent mechanical properties, heat resistance, chemical resistance, and property for molding, and is particularly excellent in resistance to heat aging; and a molded product thereof.

BACKGROUND ART

Heretofore, it has been disclosed in the specifications of Japanese Patent Application Laid-Open No. Showa 62(1987)-25795, Japanese Patent Application Laid-Open No. Heisei 1(1989)-279944, Japanese Patent Application Laid-Open No. Heisei 2(1990)-209938, Japanese Patent Application Laid-Open No. Heisei 2(1990)-219843, Japanese Patent Application Laid-Open No. Heisei 3(1991)-126744, and Japanese Patent Application Laid-Open No. Heisei 4(1992)-269893 that compositions having a good balance between strength, toughness, heat resistance, chemical resistance, and processability in molding can be obtained by melt blending a styrenic polymer having the syndiotactic configuration (hereinafter, occasionally referred to as SPS), a polyamide resin, and a compatibilizer for SPS and a polyamide as the main components of the compositions. By taking advantage of these excellent properties, practical application to products which require strength and heat resistance, such as electric and electronic parts, automobile parts, mechanical parts, and parts of industrial products, is under examination.

However, the above resin composition has a problem that the resistance to degradation by oxidation at a high temperature for a long time, i.e. the resistance to heat aging, is not sufficient although the resin compositions have the above excellent characteristics. Therefore, improvement in the resistance to heat aging for a long time has strongly been desired in order to increase reliability of the parts described above.

For solving the above problem, addition of a phenolic antioxidant (Japanese Patent Application Laid-Open No. Heisei 5(1993)-289290) and a combined use of a phenolic antioxidant and an antioxidant containing sulfur (Japanese Patent Application Laid-Open No. Heisei 6(1994)-384) have been proposed. However, sufficient increase in the resistance to heat aging is not achieved by these technologies. Addition of a combination of a copper compound and an iodine compound and addition of an amine antioxidant have also been proposed in order to increase the resistance to heat aging of a polyamide. Although the resistance to heat aging is increased to some extent by addition of these compounds, the obtained properties are not satisfactory. Moreover, the addition causes other problems that color of the molded products changes with time into yellow or brown, and that adverse effects of the copper compound arise to cause corrosion of extruders, molding machines, and the like.

On the other hand, a polyamide resin comprising a phenolic antioxidant and an antioxidant containing sulfur has been proposed. However, satisfactory results have not been obtained by using this technology, either.

Under the above circumstances, the present invention has an object of providing a polystyrenic resin composition which shows excellent resistance to heat aging so that decrease in physical properties or change in color are hardly caused even after exposure to a high temperature for a long time, has excellent toughness, rigidity, heat resistance, and chemical resistance, and can advantageously be used as a material for various types of industrial product.

DISCLOSURE OF THE INVENTION

As the result of extensive studies undertaken by the present inventors to develop a polystyrenic resin composition having the excellent resistance to heat aging as well as excellent toughness, rigidity, heat resistance, and chemical resistance, it was discovered that a resin composition of an SPS/polyamide (hereinafter, occasionally referred to as PA) alloy showing no change in color to yellow with time and no adverse effect of a metal and having excellent resistance to heat aging can be obtained when the resin composition comprises a copper compound having a specific structure and an iodine compound in specific amounts and in a specific ratio of the amounts.

It was also discovered by the present inventors that the resistance to heat aging of the above resin composition of an SPS/polyamide alloy is further enhanced when the resin composition comprises a phenolic compound having a specific structure and/or an ester of thiodipropionic acid or a derivative thereof. It was further discovered that, when the above resin composition comprises a copper inhibitor, the above resin composition shows little change in color even when the resin composition contains water or is exposed to a high temperature for a long time. The present invention has been completed on the basis of the discoveries.

Accordingly, the present invention has the first object of providing a polystyrenic resin composition comprising (A) a styrenic polymer composition containing (a) 1 to 99% by weight of a polystyrenic resin having the syndiotactic configuration, (b) 1 to 99% by weight of a polyamide resin, (c) 0.1 to 10% by weight of a compatibilizer which is compatible with component (a) and has a polar group reactive with component (b), and (d) 0 to 50% by weight of a rubbery elastomer and/or a modified rubbery elastomer and (B) a copper compound in such an amount that content of copper is 1 to 3000 ppm and an iodine compound in such an amount that ratio by mol of copper to iodine is 1 to 50, the total content of the copper compound and the iodine compound being 5 to 50,000 ppm.

The second object of the present invention is to provide a polystyrenic resin composition described above wherein the polystyrenic resin composition additionally comprises (C) 0.005 to 5.0 parts by weight of a phenolic compound represented by the following general formula (I):

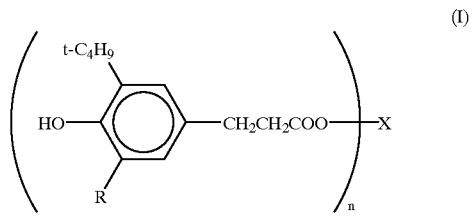

[wherein R represents methyl group or t-butyl group, X represents a residue group obtained by removing n hydroxy groups from an alcohol having 1 to 4 hydroxyl groups, and n represents an integer of 1 to 4] per 100 parts by weight of component (A).

The third object of the present invention is to provide polystyrenic resin compositions described above wherein the polystyrenic resin composition additionally comprises (D) 0.005 to 5.0 parts by weight of N,N'-hexamethylenebis (3,5-di-t-butyl-4-hydroxy-hydrocinna mide) per 100 parts by weight of component (A).

The fourth object of the present invention is to provide polystyrenic resin compositions described above wherein the polystyrenic resin composition additionally comprises (E) 0.005 to 5.0 parts by weight of an ester of thiodipropionic acid or a derivative thereof per 100 parts by weight of component (A).

The fifth object of the present invention is to provide polystyrenic resin compositions described above wherein the polystyrenic resin composition additionally comprises (F) 0.005 to 5.0 parts by weight of a copper inhibitor per 100 parts by weight of component (A).

The sixth object of the present invention is to provide polystyrenic resin compositions described above wherein the polystyrenic resin composition additionally comprises (G) 1 to 350 parts by weight of inorganic filler per 100 parts by weight of the polystyrenic resin composition excluding the inorganic filler of component (G).

The present invention has another object of providing a molded product prepared from a polystyrenic resin composition described above.

THE MOST PREFERRED EMBODIMENT TO CARRY OUT THE INVENTION

In the resin composition of the present invention, a styrenic polymer having the syndiotactic configuration is used as component (a) of component (A). The syndiotactic configuration of the styrenic polymer having the syndiotactic configuration means that the stereochemical structure has a highly syndiotactic configuration. In other words, phenyl groups and substituted phenyl groups of the side groups are alternately placed at the opposite positions with respect to the main chain formed with the carbon-carbon bonds. The tacticity in the stereochemical structure is quantitatively determined by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic polymer having the syndiotactic configuration" means polystyrene, a poly(alkylstyrene), a poly(halogenated styrene), a poly (halogenated alkylstyrene), a poly(alkoxystyrene), a poly (vinylbenzoic acid ester), a hydrogenated derivative of these polymers, a mixture of these polymers, or a copolymer containing constituting units of these polymers as the main components, which generally has a syndiotacticity of 75% or more, preferably 85% or more, expressed in terms of the content of the racemic diad, or 30% or more, preferably 50% or more, expressed in terms of the content of the racemic pentad. Examples of the poly(alkylstyrene) include poly (methylstyrene), poly(ethylstyrene), poly(isopropylstyrene), poly(tertiary-butylstyrene), poly(phenylstyrene), poly (vinylnaphthalene), poly(vinylstyrene), and the like. Examples of the poly(halogenated styrene) include poly (chlorostyrene), poly(bromo-styrene), poly(fluorostyrene), and the like. Examples of the poly-(halogenated alkylstyrene) include poly(chloromethylstyrene) and the like. Examples of the poly(alkoxystyrene) include poly (methoxystyrene), poly(ethoxystyrene), and the like.

Particularly preferable examples of the styrenic polymer described above include polystyrene, poly(p-methylstyrene), Poly(m-methylstyrene), poly(p-tertiary-butylstyrene), poly(p-chlorostyrene), poly(m-chlorostyrene), poly(p-fluorostyrene), hydrogenated polystyrene, and copolymers containing constituting units of the above polymers.

A single type or a combination of two or more types of the above styrenic polymer can be used.

The molecular weight of the styrenic polymer is not particularly limited. The weight-average molecular weight is preferably 10,000 or more, more preferably 50,000 or more. The molecular weight distribution is not limited either, and polymers having various molecular weight distributions can be used. When the weight-average molecular weight is less than 10,000, properties under heating and mechanical properties of the obtained composition or the molded products obtained from the composition are occasionally decreased, and such a weight-average molecular weight is not preferable.

The styrenic polymer having the syndiotactic configuration can be produced by polymerizing a styrenic monomer (a monomer corresponding to the above styrenic polymer) in an inert hydrocarbon solvent or in the absence of solvents by using a titanium compound and a condensation product of water and trialkylaluminum as the catalyst (the specification of Japanese Patent Application Laid-Open No. Showa 62(1987)-187708). The above poly(halogenated alkylstyrene) can be produced in accordance with the process described in the specification of Japanese Patent Application Laid-Open No. Heisei 1(1989)-46912, and the above hydrogenated derivative of the polymer described above can be produced in accordance with the process described in the specification of Japanese Patent Application Laid-Open No. Heisei 1(1989)-178505.

The amount of component (a) is selected in the range of 1 to 99% by weight, preferably in the range of 5 to 95% by weight, more preferably 20 to 80% by weight, most preferably 25 to 50% by weight, based on the total weight of the resin components. When the amount is less than 1% by weight, the water resistance of the polyamide of component (b) and the effect of stabilizing the polyamide of component (b) against acids and alkalis are not exhibited. When the amount is more than 99% by weight, the resin composition shows no difference from component (a) alone.

In the resin composition of the present invention, any conventional polyamide can be used as the polyamide of component (b) of component (A). Examples of the suitable polyamide include polyamide-4, polyamide-6, polyamide-6,6, polyamide-3,4, polyamide-12, polyamide-11, polyamide-6,10, polyamide obtained from terephthalic acid and 4,4'-diamino-hexylmethane, polyamides obtained from azelaic acid, adipic acid, and 2,2-bis(p-cyclohexyl)propane, and polyamides obtained from adipic acid and m-xylylenediamine.

An aromatic polyamide resin is a polyamide which contains aromatic rings in the main chain and an amide bond as the repeating unit. The aromatic polyamide resin can be selected from polymers obtained by the reaction of aromatic diamine components and dicarboxylic acid components in accordance with a conventional process and polymers obtained by the reaction of diamine components and dicarboxylic acid components having aromatic rings in accordance with a conventional process.

As the aromatic diamine component, a diamine having a benzene ring, such as 1,4-diaminobenzene, 1,3- diaminobenzene, 1,2-diamino-benzene, 2,4-diaminotoluene, 2,3-diaminotoluene, 2,5-diaminotoluene, 2,6-diaminotoluene, o-, m-, or p-xylylenediamine, o-, m-, or p-2,2'-diaminodiethylbenzene, 4,4'-diaminobiphenyl, 4,4'-diaminodiphenyl-methane, 4,4'-diaminodiphenyl ether, 4,4'-diaminodiphenyl thioether, 4,4'-diaminodiphenyl ketone, 4,4'-diaminodiphenyl sulfone, and the like, is used. The aromatic diamine component may be the above diamine having a benzene ring alone or may also be a mixture of the above diamine having a benzene ring with other diamines, such as aliphatic diamines, as long as the mixture contains the diamine having a benzene ring. Of course, a mixture of two or more types of the diamine having a benzene ring may be used.

Examples of the dicarboxylic acid component include aliphatic dicarboxylic acids, such as glutaric acid, adipic acid, pimellic acid, suberic acid, azelaic acid, sebacic acid, and the like; aromatic carboxylic acids, such as phthalic acid, isophthalic acid, terephthalic acid, naphthalenedicarboxylic acid, and the like; and esters and chlorides of these dicarboxylic acids. A single type or a combination of two or more types of the dicarboxylic acid may be used.

The aromatic polyamide resin can also be obtained by polymerization of an ω-amino-ω-carboxyl compound having an aromatic ring. Examples of the ω-amino-ω-carboxyl compound having an aromatic ring include 4-aminophenylcarboxylmethane, 1-(4-amino-phenyl)-2-carboxylethane, 3-(4-aminophenyl)-1-carboxylpropane, p-(3-amino-3'-carboxy)dipropylbenzene, and the like.

Preferable examples of the aromatic polyamide resin include polyamides derived from diamines having a benzene ring and aliphatic dicarboxylic acids. More preferable examples include polyamides derived from xylylenediamine and adipic acid.

A single type or a combination of two or more types of the polyamide may be used as component (b). The amount of the polyamide is selected in the range of 1 to 99% by weight, preferably in the range of 5 to 95% by weight, more preferably in the range of 20 to 80% by weight, most preferably in the range of 40 to 70% by weight, based on the total weight of the resin components. When the amount is less than 1% by weight, the properties of the resin composition shows no advantage to those of the styrenic polymer having the SPS structure alone. When the amount is more than 99% by weight, improvement in the mechanical properties and the properties under heating of the styrenic polymer having the SPS structure cannot be expected.

In the present invention, a compatibilizer which is compatible with component (a) and has a polar group reactive with component (b) is used as component (c) of component (A). The compatibilizer is used for the purpose of increasing the compatibility between component (a) and component (b) and thereby achieving fine dispersion of domains to increase the strength of the interface.

The polar group reactive with component (b) means a functional group which can react with the polar group in component (b). Specific examples of such a group include acid anhydride groups, carboxylic acid groups, carboxylic acid ester groups, carboxylic acid halide groups, carboxylic acid amide groups, carboxylic acid salt groups, sulfonic acid group, sulfonic acid ester groups, sulfonic acid chloride group, sulfonic acid amide group, sulfonic acid salt groups, epoxy group, amino group, imido group, oxazoline group, and the like.

The property of being compatible with component (a) is exhibited by a structure which has a sequence of units showing compatibility with component (a) in a polymer chain. Examples of such a structure include polymers having syndiotactic polystyrene, atactic polystyrene, isotactic polystyrene, styrenic polymers, polyphenylene ether, polyvinyl methyl ether, or the like as the main chain, a block chain, or a graft chain.

Specific examples of component (c) include modified styrenic polymers, such as styrene-maleic anhydride copolymer (SMA), styrene-glycidyl methacrylate copolymer, polystyrene modified with a carboxylic acid at the ends, polystyrene modified with epoxy group at the ends, polystyrene modified with oxazoline group at the ends, polystyrene modified with amine group at the ends, sulfonated polystyrenes, styrenic ionomers, styrene-methyl methacrylate graft polymer, (styrene-glycidyl methacrylate)-methyl methacrylate graft polymer, acrylate-styrene graft polymers modified with an acid, (styrene-glycidyl methacrylate)-styrene graft polymer, polybutylene terephthalate-polystyrene graft polymer, SPS modified with maleic anhydride, SPS modified with fumaric acid, SPS modified with glycidyl methacrylate, SPS modified with an amine, and the like; and modified polyphenylene ether polymers, such as (styrene-maleic anhydride)-polyphenylene ether graft polymer, polyphenylene ether modified with maleic anhydride, polyphenylene ether modified with fumaric acid, polyphenylene ether modified with glycidyl methacrylate, polyphenylene ether modified with an amine, and the like. Among these compounds, modified polyphenylene ethers and modified SPS are preferable.

The above modified polyphenylene ethers can be obtained by modifying a conventional polyphenylene ether with a modifier. The method of modification is not limited as long as the modified product can be used in accordance with the object of the present invention.

The polyphenylene ethers used for the modification are known compounds, and the specifications of U.S. Pat. Nos. 3,306,874, 3,306,875, 3,257,357, and 3,257,358 can be referred to for this purpose. Polyphenylene ethers can generally be produced by the oxidative coupling reaction forming homopolymers or copolymers in the presence of a copper-amine complex and one or more types of phenol which are substituted at two or three positions. As the copper-amine complex, a copper-amine complex derived from a primary, secondary, or tertiary amine can be used. Examples of the suitable polyphenylene ether include poly (2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly (2-chloro-1,4-phenylene ether), poly(2-methyl-1,4-phenylene ether), poly(2-chloro-6-ethyl-1,4-phenylene ether), poly(2-chloro-6-bromo- 1,4-phenylene ether), poly (2,6-di-n-propyl-1,4-phenylene ether), poly(2-methyl-6-isopropyl-1,4-phenylene ether), poly(2-chloro-6-methyl-1, 4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Further examples of the suitable polyphenylene ether include copolymers, such as copolymers derived from two or more types of phenol which are used for preparation of the homopolymers described above. Still further examples of the suitable polyphenylene ether include graft copolymers and block copolymers derived from vinylaromatic compounds, such as polystyrene, and the polyphenylene ether described above. Among these compounds, poly(2,6-dimethyl-1,4-phenylene ether) is particularly preferably used.

As the modifier used for modification of the polyphenylene ethers, compounds having an ethylenic double bond and a polar group in the same molecule are used. Examples of the modifier include maleic anhydride, maleic acid, fumaric acid, esters of maleic acid, esters of fumaric acid, maleimide, maleimide having substituents on N, salts of maleic acid, salts of fumaric acid, acrylic acid, esters of acrylic acid, acrylamide, salts of acrylic acid, methacrylic acid, esters of methacrylic acid, methacrylamide, salts of methacrylic acid, glycidyl methacrylate, and the like. Among these modifiers, maleic anhydride, fumaric acid, and glycidyl methacrylate are particularly preferably used. A single type or a combination of two or more types of the above modifier can be used. The above modified polyphenylene ether can be obtained by bringing the above polyphenylene ether and the above modifier into reaction with each other, for example, in the presence of a solvent or another resin. The process for the modification is not particularly limited, and a conventional process can be used. Examples of the conventional process include a process in which the reaction is allowed to proceed by melt kneading the above components at a temperature in the range of 150 to 350° C. using a roll mill, a Banbury mixer, an extruder, or the like and a process in which the reaction is allowed to proceed by heating the above components in a solvent, such as benzene, toluene, and xylene. In order to facilitate the reaction, it is effective that a radical generating agent, such as benzoyl peroxide, di-t-butyl peroxide, dicumyl peroxide, t-butyl peroxybenzoate, azobisisobutyronitrile, azobisisovaleronitrile, 2,3-diphenyl-2,3-dimethylbutane, or the like, is present in the reaction system. Among these processes, the process in which the reaction is allowed to proceed by melt kneading the components in the presence of a radical generating agent is preferable.

As component (c), modified SPS having a polar group may also be used. The modified SPS can be obtained by modifying SPS described as component (a) in the above with a modifier. However, the process for obtaining the modified SPS is not limited to this process as long as the modified SPS can be used in accordance with the object of the present invention.

SPS used for the modification is not particularly limited, and polymers described as component (a) in the above can be used. Among these polymers, homopolymer of styrene or a copolymer of styrene with a substituted styrene is preferably used in view of the compatibility with other components. The composition of the copolymer is not particularly limited. It is preferred that the content of the unit of the substituted styrene is 50% by mol or less. When the content is larger than 50% by mol, the compatibility with other components is decreased, and such a content is not preferable. Examples of the particularly preferable substituted styrene include alkylstyrenes, such as methyl styrene, ethylstyrene, isopropylstyrene, tertiary-butylstyrene, vinylstyrene, and the like; halogenated styrenes, such as chlorostyrene, bromostyrene, fluorostyrene, and the like; halogenated alkylstyrenes, such as chloromethylstyrene, and the like; and alkoxystyrenes, such as methoxystyrene, ethoxystyrene, and the like. A single type or a combination of two or more types of the substituted styrene can be used.

Polymers having the atactic configuration corresponding to the above SPS may also be used as long as the used amount is 5% by weight or less based on the amount of SPS. When the amount is more than 5% by weight, the heat resistance of the composition is decreased, and such an amount is not preferable.

As the modifier used for modification of SPS, compounds having an ethylenic double bond and a polar group in the same molecule can be used. Examples of the modifier include maleic anhydride, maleic acid, fumaric acid, esters of maleic acid, esters of fumaric acid, maleimide, maleimide having substituents on N, salts of maleic acid, salts of fumaric acid, acrylic acid, esters of acrylic acid, acrylamide, salts of acrylic acid, methacrylic acid, esters of methacrylic acid, methacrylamide, salts of methacrylic acid, glycidyl methacrylate, and the like. Among these modifiers, maleic anhydride, fumaric acid, and glycidyl methacrylate are particularly preferably used. A single type or a combination of two or more types of the above modifier can be used.

The above modified SPS can be obtained by bringing the above SPS and the above modifier into reaction with each other, for example, in the presence of a solvent or another resin. The process for the modification is not particularly limited, and a conventional process can be used. Examples of the conventional process include a process in which the reaction is allowed to proceed by melt kneading the above components at a temperature in the range of 150 to 350° C. using a roll mill, a Banbury mixer, an extruder, or the like and a process in which the reaction is allowed to proceed by heating the above components in a solvent, such as benzene, toluene, and xylene. In order to facilitate the reaction, it is effective that a radical generating agent, such as benzoyl peroxide, di-t-butyl peroxide, dicumyl peroxide, t-butyl peroxybenzoate, azobisisobutyro-nitrile, azobisisovaleronitrile, 2,3-diphenyl-2,3-dimethylbutane, or the like, is present in the reaction system. Among these processes, the process in which the reaction is allowed to proceed by melt kneading the components in the presence of a radical generating agent is preferable.

Among these modified SPS, SPS modified with maleic anhydride, SPS modified with fumaric acid, and SPS modified with glycidyl methacrylate are particularly preferably used.

A single type or a combination of two or more types of component (c) can be used. The content of the polar group in component (c) is in the range of 0.01 to 20% by weight, preferably in the range of 0.05 to 10% by weight, more preferably in the range of 0.5 to 5% by weight. When the content is less than 0.01% by weight, a large amount of component (c) is required for exhibiting the effect of the compatibilizer to cause decrease in the physical properties and the heat resistance of the composition, and such a content is not preferable. When the content is more than 20% weight, the compatibility with component (a) is decreased, and such a content is not preferable either.

The content of component (c) is selected in the range of 0.1 to 10% by weight, preferably in the range of 0.5 to 8% by weight, more preferably in the range of 1 to 6% by weight, based on the total weight of the resin components. When the content is less than 0.1% by weight, the effect of improving the toughness is not sufficient. When the content is more than 10% by weight, the crystallinity of component (a) is decreased to cause decrease in the heat resistance and the property for molding. Therefore, such contents are not preferable.

In the resin composition of the present invention, a rubbery elastomer and/or a modified rubbery elastomer is used as component (d) of component (A). The rubbery elastomer is used for increasing the impact resistance and the toughness, such as elongation, of the resin composition.

Specific examples of the rubbery elastomer used as component (d) include natural rubber, polybutadiene, polyisoprene, polyisobutylene, neoprene, polysulfide rubber, thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene rubber (EPR), ethylene-propylene-diene rubber (EPDM), core-shell type particulate elastomers, such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), an alkyl acrylate-butadiene-acrylonitrile-styrene core-shell rubber (AABS), butadiene-styrene core-shell rubber (SBR), and core-shell rubbers containing siloxane such as methyl methacrylate-butyl acrylate-siloxane and the like, and rubbers obtained by modification of these rubbers.

Among these rubbers, SBR, SBS, SEB, SEBS, SIR, SEP, SIS, SEPS, core-shell rubbers, and rubbers obtained by modification of these rubbers are preferably used.

Specific examples of the modified rubbery elastomer used as component (d) include rubbers obtained by modification of rubbers, such as styrene-butyl acrylate copolymer, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer, styrene-ethylene-butylene random copolymer, ethylene-propylene rubber (EPR), and ethylene-propylene-diene rubber (EPDM), with a modifier having a polar group. Among these rubbers, rubbers obtained by modification of SEB, SEBS, SEP, SEPS, EPR, and EPDM, are preferably used. More specifically, SEBS modified with maleic anhydride, SEPS modified with maleic anhydride, EPR modified with maleic anhydride, EPDM modified with maleic anhydride, SEBS modified with epoxy group, SEPS modified with epoxy group, and the like are preferably used.

A single type or a combination of two or more types of these rubbery elastomer can be used. The content of the rubbery elastomer is selected in the range of 0 to 50% by weight based on the total weight of the resin components. When the content is more than 50% by weight, the modulus and the heat resistance of the composition are significantly decreased, and such a content is not preferable.

In the resin composition as the first object of the present invention, a copper compound and an iodine compound are used as component (B). Examples of the copper compound include inorganic copper halides, such as copper chlorides, copper bromides, and copper iodides; copper salts of inorganic acids, such as copper sulfates, copper nitrates, and copper phosphates; copper salts of organic acids, such as copper acetates, copper salycilates, copper stearates, copper oleates, copper benzoates, copper formates, copper propionates, copper oxalates, copper sebacates, copper lactates, copper montanoates, copper adipates, copper isophthalates, copper pyrophosphates, and ammonia copper; and complex compounds of inorganic copper halides with xylylenediamine, benzimidazole, 2-mercaptobenzimidazole, and the like. Among these compounds, copper chlorides, copper bromides, copper iodides, and copper nitrates are particularly preferably used.

A single type or a combination of two or more types of the copper compound can be used. The copper compound is contained in such an amount that the content of copper in the above resin composition is in the range of 1 to 3,000 ppm, preferably in the range of 5 to 2,000 ppm, more preferably 20 to 500 ppm. When the amount is less than 1 ppm, sufficient resistance to heat aging cannot be obtained. When the amount is more than 3,000 ppm, the resistance to heat aging is saturated, and the finished products show inferior appearance and significant change in color by absorption of water. Therefore, such amounts are not preferable.

Examples of the iodine compound include potassium iodide, magnesium iodide, ammonium iodide, and the like. Elemental iodine can also be used. A single type or a combination of two or more types of the iodine compound can be used. The iodine compound is contained in such an amount that the ratio by mol of copper to iodine is 1 to 50, preferably in the range of 1 to 30, more preferably in the range of 5 to 30. When the ratio by mol is less than 1, sufficient resistance to heat aging cannot be obtained, and color of the finished product significantly changes by absorption of water . When the ratio is more than 50, corrosion of metals of extruders, molding machines, and the like as well as corrosion of metals inserted into molded products tend to take place. Therefore, such amounts are not preferable.

The total content of the above copper compound and the above iodine compound in the above resin composition is in the range of 5 to 50,000 ppm, preferably in the range of 10 to 30,000 ppm, more preferably in the range of 100 to 2,000 ppm. When the amount is less than 5 ppm, sufficient resistance to heat aging cannot be obtained. When the amount is more than 50,000 ppm, the electric properties of the resin are decreased. Therefore, such amounts are not preferable.

In the resin composition as the second object of the present invention, a phenolic compound represented by the following general formula (I):

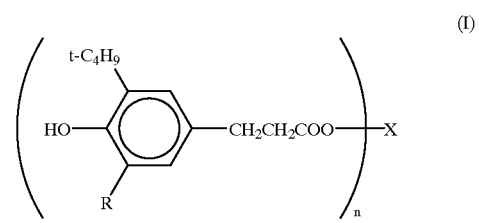

[wherein R represents methyl group or t-butyl group, X represents a residue group obtained by removing n hydroxy groups from an alcohol having 1 to 4 hydroxyl groups, and n represents an integer of 1 to 4] is additionally comprised as component (C). Specific examples of the phenolic compound include n-octadecyl-3-(3,5-di-t-butyl-4-hydroxyphenyl) propionate (trade name: IRGANOX 1076, ADEKASTAB AO-50, or SUMILIZER BP-76), triethylene glycol-bis[3-(3-t-butyl-5-methyl-4-hydroxyphenyl) propionate (trade name: IRGANOX 245), 1,6-hexanediol-bis[3-(3,5-di-t-butyl-4-hydroxyphenyl) propionate] (trade name: IRGANOX 259), 2,2-thio-diethylenebis[3-(3,5-di-t-butyl-4-hydroxyphenyl) propionate] (trade name: IRGANOX 1035), 3,9-bis[1,1-dimethyl-2-{β-(3-t-butyl-4-hydroxyl-5-methylphenyl) propionyloxy}-ethyl]-2,4,8,10-tetraoxaspiro[5,5]undecane (trade name: ADEKASTAB AO-80 or SUMILIZER GA-80), pentaerythrityl-tetrakis[3-(3,5-di-t-butyl-4-hydroxyphenyl) propionate] (trade name: IRGANOX 1010, ADEKASTAB AO-60, or SUMILIZER BP-101), and the like. Among these compounds, 3,9-bis[1,1-dimethyl-2-{β-(3-t-butyl-4-hydroxyl-5-methylphenyl) propionyloxy}-ethyl]-2,4,8,10-tetraoxaspiro[5,5]undecane, pentaerythrityl-tetrakis[3-(3,5-di-t-butyl-4-hydroxyphenyl) propionate], and n-octadecyl-3-(3,5-di-t-butyl-4-hydroxyphenyl) propionate are preferable.

A single type or a combination of two or more types of the phenolic compound can be used. The content in the above resin composition is in the range of 0.005 to 5.0 parts by weight, preferably in the range of 0.01 to 3.0 parts by weight, more preferably in the range of 0.01 to 2.0 parts by weight, most preferably in the range of 0.1 to 1.0 parts by weight, per 100 parts by weight of component (A). When the amount is less than 0.005 parts by weight, the physical properties are significantly decreased in the heat aging test to show insufficient effect of the addition. When the amount is more than 5.0 parts by weight, blooming to the surface takes place to cause inferior surfaces and decrease in the surface hardness, the physical properties, and the heat resistance of the molded products, and moreover the effect of addition is saturated. Economic disadvantage is also caused. Therefore, such amounts are not preferable.

In the resin composition as the third object of the present invention, N,N'-hexamethylenebis(3,5-di-t-butyl-4-hydroxy-hydrocinnamide) is additionally comprised as component (D).

The content of component (D) in the above resin composition is in the range of 0.005 to 5.0 parts by weight, preferably in the range of 0.01 to 3.0 parts by weight, more preferably in the range of 0.01 to 2.0 parts by weight, most preferably in the range of 0.1 to 1.0 parts by weight, per 100 parts by weight of component (A). When the amount is less than 0.005 parts by weight, the physical properties are significantly decreased in the heat aging test to show insufficient effect of the addition. When the amount is more than 5.0 parts by weight, blooming to the surface takes place to cause inferior surfaces and decrease in the surface hardness, the physical properties, and the heat resistance of the molded products, and moreover the effect of addition is saturated. Economic disadvantage is also caused. Therefore, such amounts are not preferable.

In the resin composition as the fourth object of the present invention, an ester of thiodipropionic acid or a derivative thereof is additionally comprised as component (E). Specific examples of the ester of thiodipropionic acid and the derivative thereof include dilauryl 3,3'-thiodipropionate (trade name: SUMILIZER TPL-R, or YOSHITOMI DLTP), ditridecyl 3,3'-thiodipropionate (trade name: SUMILIZER TL), dimyristyl 3,3'-thiodipropionate (trade name: SUMILIZER TPM), distearyl 3,3'-thiodipropionate (trade name: SUMILIZER TPS), distearyl 3,3'-methyl-3,3'-thiodipropionate, tetrakis[methylene-3-(hexylthio) propionate]methane, tetrakis[methylene-3-(dodecylthio) propionate]-methane (trade name: SUMILIZER TP-D or ADEKASTAB AO-412S), tetrakis[methylene-3-(octadecylthio) propionate]methane, and the like. Among these compounds, tetrakis[methylene-3-(dodecylthio) propionate]methane is particularly preferable.

A single type or a combination of the ester of thiodipropionic acid or the derivative thereof can be used. The content in the above resin composition is in the range of 0.005 to 5.0 parts by weight, preferably in the range of 0.01 to 3.0 parts by weight, more preferably in the range of 0.01 to 2.0 parts by weight, most preferably in the range of 0.1 to 1.0 parts by weight, per 100 parts by weight of component (A). When the amount is less than 0.005 parts by weight, the physical properties are significantly decreased in the heat aging test to show insufficient effect of the addition. When the amount is more than 5.0 parts by weight, blooming to the surface takes place to cause inferior surfaces and decrease in the surface hardness, the physical properties, and the heat resistance of the molded products, and moreover the effect of addition is saturated. Economic disadvantage is also caused. Therefore, such amounts are not preferable.

In the resin composition as the fifth object of the present invention, a copper inhibitor is additionally comprised as component (F). As the copper inhibitor, any copper inhibitor can be selected from conventional copper inhibitors, such as derivatives of oxalic acid, derivatives of salycilic acid, derivatives of hydrazine, and the like. Specific examples of the copper inhibitor include 3-(N-salyciloyl)amino-1,2,4-triazole (trade name: ADEKASTAB CDA-1), decamethylenecarboxylic acid disalyciloyl hydrazide (trade name: ADEKASTAB CDA-6), N,N-bis[3-(3,5-di-t-butyl-4-hydroxyphenyl)propionyl] hydrazine (trade name: IRGANOX MD1024),isophthalic acid bis(2-phenoxypropionyl hydrazide) (trade name: CUNOX), N-formyl-N'-salyciloyl hydrazine, 2,2-oxamidobis-[ethyl-3-(3,5-di-t-butyl-4-hydroxyphenyl) propionate] (trade name: NAUGARD XL-1), oxalyl-bis-benzylidene hydrazide (trade name: INHIBITOR OABH), and the like.

A single type or a combination of two or more types of the copper inhibitor can be used. The content in the above resin composition is in the range of 0.005 to 5.0 parts by weight, preferably in the range of 0.01 to 3.0 parts by weight, more preferably in the range of 0.01 to 2.0 parts by weight, most preferably in the range of 0.1 to 1.0 parts by weight, per 100 parts by weight of component (A). When the amount is less than 0.005 parts by weight, color changes significantly by absorption of water and in the heat aging test to show insufficient effect of addition. When the amount is more than 5.0 parts by weight, blooming to the surface takes place to cause inferior surfaces and decrease in the surface hardness, the physical properties, and the heat resistance of the molded products, and moreover the effect of addition is saturated. Economic disadvantage is also caused. Therefore, such amounts are not preferable.

In the resin composition as the sixth object of the present invention, inorganic filler is additionally comprised as component (G). As the inorganic filler, inorganic fillers treated with a coupling agent on the surface are preferably used in order to enhance adhesion with the styrenic resin of component (a) of component (A).

The inorganic filler may have various shapes, such as fiber, granules, powder, and the like. As the filler having the shape of fiber, glass fiber, carbon fiber, wiskers, ceramic fiber, metal fibers, and the like can be used. Specific examples of the filler having the shape of fiber include wiskers, such as boron wisker, alumina wisker, silica wisker, silicon carbide wisker; ceramic fibers, such as gypsum fiber, potassium titanate fiber, magnesium sulfate fiber, magnesium oxide fiber, and the like; and metal fibers, such as copper fiber, aluminum fiber, steel fiber, and the like. As for the form of the filler, the filler may have a form of a cloth, a mat, a cut bundle, short fibers, filaments, or wiskers. When the filler has the form of cut bundles, it is preferred that the length is 0.05 to 50 mm and the diameter of a fiber is 5 to 20 μm. When the filler has the form of a cloth or a mat, the length is preferably 1 mm or more, more preferably 5 mm or more.

Examples of the filler having a shape of granules or powder include talc, carbon black, graphite, titanium dioxide, silica, mica, calcium carbonate, calcium sulfate, barium carbonate, magnesium carbonate, magnesium sulfate, barium sulfate, calcium oxysulfate, tin oxides, alumina, kaolin, silicon carbide, metal powders, glass powder, glass flakes, glass beads, and the like. Among these fillers, glass fillers, such as glass filament, glass fiber, glass roving, glass mat, glass powder, glass flakes, and glass beads, are particularly preferable.

An inorganic filler, such as those described above, is treated on the surface with a coupling agent conventionally used for a surface treatment, such as a silane coupling agent and a titanium coupling agent, and is used as the inorganic filler treated on the surface thereof. Specific examples of the silane coupling agent include triethoxysilane, vinyltris(β-methoxyethoxy)silane, γ-methacryloxypropyltrimethoxy-silane, γ-glycidoxypropyltrimethoxysilane, β-(1,1-epoxycyclohexyl)-ethyltrimethoxysilane, N-β-(aminoethyl)-γ-aminopropyltrimethoxy-silane, N-β-(aminoethyl)-γ-aminopropylmethyldimethoxysilane, γ-aminopropyltriethoxysilane, N-phenyl-γ-aminopropyltrimethoxysialne, γ-mercaptopropyltrimethoxysilane, γ-chloropropyltrimethoxysilane, γ-aminopropyltrimethoxysilane, γ-aminopropyl-tris(2-methoxy-ethoxy)-silane, N-methyl-γ-aminopropyltrimethoxysilane, N-vinylbenzyl-γ-aminopropyltriethoxysilane, triaminopropyltrimethoxysilane, 3-ureydopropyltrimethoxysilane, 3-4,5-dihydroimidazolpropyltriethoxy-silane, hexamethyldisilazane, N,O-(bistrimethylsilyl)amide, N,N-bis(trimethylsilyl)urea, and the like. Among these compounds, aminosilanes and epoxysilanes, such as γ-aminopropyltrimethoxysilane, N-β-(aminoethyl)-γ-aminopropyltrimethoxysilane, γ-glycidoxypropyl-trimethoxysilane, β-(3,4-epoxycyclohexyl) ethyltrimethoxysilane, and the like, are particularly preferable.

Specific examples of the titanium coupling agent include isopropyl triisostearoyl titanate, isopropyl tridodecylbenzene sulfonyl titanate, isopropyl tris(dioctyl pyrophosphate) titanate, tetraisopropyl bis(dioctyl phosphite) titanate, tetraoctyl bis(ditridecyl phosphite) titanate, tetra(1,1-diallyloxymethyl-1-butyl) bis(ditridecyl) phosphite titanate, bis(dioctyl pyrophosphate) oxyacetate titanate, bis(dioctyl pyrophosphate) ethylene titanate, isopropyl trioctanoyl titanate, isopropyl dimethacryl isostearoyl titanate, isopropyl isostearoyl diacryl titanate, isopropyl tri(dioctyl phosphate) titanate, isopropyl tricumyl phenyl titanate, isopropyl tri(N-amidoethyl, aminoethyl) titanate, dicumyl phenyloxy acetate titanate, diisostearoyl ethylene titanate, and the like. Among these compounds, isopropyl tri(N-amidoethyl, aminoethyl) titanate is preferable.

The surface treatment of the above filler by using the above coupling agent can be conducted in accordance with a conventional process, and the process is not particularly limited. A suitable process can be selected in accordance with the shape of the filler, for example, from the sizing treatment in which the filler is coated with a solution of the above coupling agent in an organic solvent or with a suspension of the above coupling agent, i.e., with the so-called sizing agent, the dry mixing process using a Henschel mixer, a super mixer, a Redige mixer, or a V-type mixer, the spraying process, the integral blending process, the dry concentrate process, and the like. The sizing treatment, the dry mixing process, and the spraying process are preferable among these processes.

A film forming substance for glass may be used in combination with the above coupling agent. The film forming substance is not particularly limited. Examples of the film forming substances include polymers such as polyesters, polyurethanes, epoxy polymers, acrylic polymers, vinyl acetate polymers, polyethers, and the like.

In the present invention, organic filler may be used in addition to the above inorganic filler of component (G). Examples of the organic filler include organic synthetic fibers, natural fibers, and the like. Specific examples of the organic synthetic fiber include all aromatic polyamide fibers, polyimide fibers, and the like.

A single type or a combination of two or more types of the inorganic filler can be used. The amount of the inorganic filler is in the range of 1 to 350 parts by weight, preferably 5 to 200 parts by weight, based on 100 parts by weight of the polystyrenic resin composition excluding the inorganic filler of component (G). When the amount is less than 1 part by weight, a sufficient effect as the filler is not obtained. When the amount is more than 350 parts by weight, dispersion is inferior and molding becomes difficult. Therefore, such amounts are not preferable.

In the resin composition of the present invention, various types of additional components, such as additives such as nucleating agents, plasticizers, mold release agents, flame retardants, antistatic agents, foaming agents, pigments, carbon black, processing auxiliary agents, metal soaps, and the like, as well as other thermoplastic resins, may be comprised within the range that the objects of the present invention are not adversely affected.

The present invention is described in more detail with reference to examples in the following. However, the present invention is not limited by the examples.

The amounts of components (B), (C), (E), (F), and (G) of the present invention used in the examples and the comparative examples are shown in Tables 1 and 2. Physical properties in the examples and the comparative examples were evaluated in accordance with the following methods.

(1) The tensile strength and the elongation were measured in accordance with the method of Japanese Industrial Standard K-7113. A test piece in accordance with ASTM No. 4 having a thickness of 1 mm or 3 mm was used. The rate of extension was 50 mm/minute for the test piece having a thickness of 1 mm and 5 mm/minute for the test piece having a thickness of 3 mm.

(2) The resistance to heat aging was evaluated by measuring the tensile strength and the elongation of a test piece after the test piece was placed in an air oven kept at a specific constant temperature for 1,000 hours.

Preparation Example 1 (Preparation of SPS)

A 2 liter reactor was charged with 1.0 liter of purified styrene and 1 mmol of triethylaluminum, and the mixture was heated to 80° C. To the heated mixture, 16.5 ml of a preliminarily mixed catalyst [prepared by using 90 micromol of pentamethylcylcopentadienyltitanium trimethoxide, 90 micromol of dimethylanilinium tetrakis-(pentafluorophenyl) borate, 29.1 mmol of toluene, and 1.8 mmol of triisobutylaluminum] was added, and the polymerization was allowed to proceed at 80° C. for 5 hours. After the reaction was finished, the reaction product was repeatedly washed with methanol and dried to obtain 380 g of a polymer.

The weight-average molecular weight of the obtained polymer was measured by the gel permeation chromatography by using 1,2,4-trichlorobenzene as the solvent at 130° C. and found to be 400,000. The ratio of the weight-average molecular weight to the number-average molecular weight was 2.60. By the measurements of the melting point and the $^{13}$C-NMR spectrum, the obtained polymer was confirmed to be SPS.

Preparation Example 2 (Preparation of a modified polyphenylene ether)

One kg of polyphenylene ether (inherent viscosity, 0.47 dl/g, in chloroform at 25° C.), 60 g of maleic anhydride, and 10 g of 2,3-dimethyl-2,3-diphenylbutane (a product of NIPPON YUSHI Co., Ltd.; trade name, NOFMER BC) as the radical generating agent were dry blended. The obtained blend was melt kneaded by using a 30 mm twin screw extruder at a rotation speed of 200 rpm at a set temperature of 300° C. The temperature of the resin was about 330° C. After being cooled, the obtained strands were formed into pellets to obtain a polyphenylene ether modified with maleic anhydride. For the measurement of the degree of modification, 1 g of the modified polyphenylene ether obtained above was dissolved into ethylbenzene and reprecipitated with methanol. The recovered polymer was extracted with methanol by a Soxhlet extractor and dried. The degree of modification was obtained from the intensity of the absorption of carbonyl group in the infrared spectrum of the obtained polymer and also by titration of the obtained polymer. The degree of modification was found to be 2.0% by weight.

EXAMPLE 1

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 50 ppm and the content of iodine was 1,000 ppm. After the above components were dry blended by a Henschel mixer, the obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55FPA) at a set cylinder temperature of 290° C. The prepared test piece was left standing in an air oven at 150° C. for 1,000 hours, and then the tensile strength and the elongation were measured.

The results are shown in Table 2.

EXAMPLE 2

The same procedures as those conducted in Example 1 were conducted except that copper iodide and potassium iodide were added in such amounts that the content of copper was 50 ppm and the content of iodine was 1,500 ppm.

The results are shown in Table 2.

EXAMPLE 3

The same procedures as those conducted in Example 1 were conducted except that copper iodide and potassium iodide were added in such amounts that the content of copper was 150 ppm and the content of iodine was 1,500 ppm.

The results are shown in Table 2.

EXAMPLE 4

The same procedures as those conducted in Example 1 were conducted except that copper iodide and potassium iodide were added in such amounts that the content of copper was 300 ppm and the content of iodine was 1,500 ppm.

The results are shown in Table 2.

EXAMPLE 5

The same procedures as those conducted in Example 1 were conducted except that copper acetate and potassium iodide were added in place of copper iodide and potassium iodide in such amounts that the content of copper was 50 ppm and the content of iodine was 1,500 ppm.

The results are shown in Table 2.

EXAMPLE 6

The same procedures as those conducted in Example 1 were conducted except that copper(I) chloride and potassium iodide were added in place of copper iodide and potassium iodide in such amounts that the content of copper was 50 ppm and the content of iodine was 1,500 ppm.

The results are shown in Table 2.

EXAMPLE 7

The same procedures as those conducted in Example 1 were conducted except that copper(I) bromide and potassium iodide were added in place of copper iodide and potassium iodide in such amounts that the content of copper was 50 ppm and the content of iodine was 1,500 ppm.

The results are shown in Table 2.

EXAMPLE 8

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 50 ppm and the content of iodine was 1,500 ppm. To 100 parts by weight of the total of the above components, 0.3 parts by weight of IRGANOX 1010 (a product of CIBA GEIGY Co., Ltd.) was added as the phenolic compound. After all the components were dry blended by a Henschel mixer, the obtained blend was melt kneaded by using a twin screw extruder (a product of TOSHIBA KIIAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55FPA) at a set cylinder temperature of 290° C. The prepared test piece was left standing in an air oven at 150° C. for 1,000 hours, and then the tensile strength and the elongation were measured.

The results are shown in Table 2.

EXAMPLE 9

The same procedures as those conducted in Example 8 were conducted except that 0.3 parts by weight of ADEKASTAB AO-80 (a product of ASAHI DENKA Co., Ltd.) was added as the phenolic compound in place of 0.3 parts by weight of IRGANOX 1010 (a product of CIBA GEIGY Co., Ltd.).

The results are shown in Table 2.

EXAMPLE 10

The same procedures as those conducted in Example 8 were conducted except that 0.3 parts by weight of IRGANOX 1098 (a product of CIBA GEIGY Co., Ltd.) was added as the phenolic compound in place of 0.3 parts by weight of IRGANOX 1010 (a product of CIBA GEIGY Co., Ltd.).

The results are shown in Table 2.

EXAMPLE 11

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 50 ppm and the content of iodine was 1,500 ppm. To 100 parts by weight of the total of the above components, 0.3 parts by weight of IRGANOX 1010 (a product of CIBA GEIGY Co., Ltd.) as the phenolic compound and 0.3 parts by weight of SUMILIZER TP-D (a product of SUMITOMO KAGAKU Co., Ltd.) as the ester of thiodipropionic acid or the derivative thereof were added. After all the components were dry blended by a Henschel mixer, the obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55FPA) at a set cylinder temperature of 290° C. The prepared test piece was left standing in an air oven at 150° C. for 1,000 hours, and then the tensile strength and the elongation were measured.

The results are shown in Table 2.

EXAMPLE 12

The same procedures as those conducted in Example 11 were conducted except that 0.3 parts by weight of ADEKASTAB AO-80 (a product of ASAHI DENKA Co., Ltd.) as the phenolic compound and 0.3 parts by weight of SUMILIZER TP-D (a product of SUMITOMO KAGAKU Co., Ltd.) as the ester of thiodipropionic acid or the derivative thereof were added in place of 0.3 parts by weight of IRGANOX 1010 (a product of CIBA GEIGY Co., Ltd.) and 0.3 parts by weight of SUMILIZER TP-D (a product of SUMITOMO KAGAKU Co., Ltd.).

The results are shown in Table 2.

EXAMPLE 13

The same procedures as those conducted in Example 11 were conducted except that 0.3 parts by weight of IRGANOX 1098 (a product of CIBA GEIGY Co., Ltd.) as the phenolic compound and 0.3 parts by weight of SUMILIZER TP-D (a product of SUMITOMO KAGAKU Co., Ltd.) as the ester of thiodipropionic acid or the derivative thereof were added in place of 0.3 parts by weight of IRGANOX 1010 (a product of CIBA GEIGY Co., Ltd.) and 0.3 parts by weight of SUMILIZER TP-D (a product of SUMITOMO KAGAKU Co., Ltd.).

The results are shown in Table 2.

EXAMPLE 14

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 50 ppm and the content of iodine was 1,500 ppm. To 100 parts by weight of the total of the above components, 0.3 parts by weight of IRGANOX MD1024 (a product of CIBA GEIGY Co., Ltd.) was added as the copper inhibitor. After all the components were dry blended by a Henschel mixer, the obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55EPN) at a set cylinder temperature of 290° C. The prepared test piece was left standing in an air oven at 150° C. for 1,000 hours, and then the tensile strength and the elongation were measured.

The results are shown in Table 2.

EXAMPLE 15

The same procedures as those conducted in Example 14 were conducted except that 0.3 parts by weight of ADEKASTAB CDA-6 (a product of ASAHI DENKA Co., Ltd.) was added as the copper inhibitor in place of 0.3 parts by weight of IRGANOX MD1024 (a product of CIBA GEIGY Co., Ltd.).

The results are shown in Table 2.

EXAMPLE 16

The same procedures as those conducted in Example 14 were conducted except that 0.3 parts by weight of NAUGARD XL-1 (a product of UNIROYAL CHEMICAL Co., Ltd.) was added as the copper inhibitor in place of 0.3 parts by weight of IRGANOX MD1024 (a product of CIBA GEIGY Co., Ltd.).

The results are shown in Table 2.

EXAMPLE 17

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 50 ppm and the content of iodine was 1,500 ppm. To 100 parts by weight of the total of the above components, 0.3 parts by weight of IRGANOX 1010 (a product of CIBA GEIGY Co., Ltd.) as the phenolic compound, 0.3 parts by weight of SUMILIZER TP-D (a product of SUMITOMO KAGAKU Co., Ltd.) as the ester of thiodipropionic acid or the derivative thereof, and 0.3 parts by weight of IRGANOX MD1024 (a product of CIBA GEIGY Co., Ltd.) as the copper inhibitor were added. All the components were melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55EPN) at a set cylinder temperature of 290° C. The prepared test piece was left standing in an air oven at 150° C. for 1,000 hours, and then the tensile strength and the elongation were measured.

The results are shown in Table 2.

COMPARATIVE EXAMPLE 1

A mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072) was dry blended by a Henschel mixer. The obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55FPA) at a set cylinder temperature of 290° C. The prepared test piece was left standing in an air oven at 150° C. for 1,000 hours, and then the tensile strength and the elongation were measured.

The results are shown in Table 2.

COMPARATIVE EXAMPLE 2

To a mixture containing 33% by weight of SPS, 60% by weight of a polyamide 66 (a product of UBE KOSAN Co., Ltd.; trade name, 2015B), 2% by weight of the polyphenylene ether modified with maleic anhydride, and 5% by weight of SEBS modified with maleic anhydride (a product of ASAHI KASEI Co., Ltd.; trade name, MX-072), copper iodide was added in such an amount that the content of copper was 50 ppm. After the above components were dry blended by a Henschel mixer, the obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece for the tensile test was prepared by an injection molding machine (a product of TOSHIBA KIKAI Co., Ltd.; IS55EPN) at a set cylinder temperature of 290° C. The prepared test piece was left standing in an air oven at 150° C. for 1,000 hours, and then the tensile strength and the elongation were measured.

The results are shown in Table 2.

COMPARATIVE EXAMPLE 3

To a mixture containing 33% by weight of SPS, 60% by weight of a polyamide 66 (a product of UBE KOSAN Co., Ltd.; trade name, 2015B), and 2% by weight of the polyphenylene ether modified with maleic anhydride, and 5% by weight of SEBS modified with maleic anhydride (a product of ASAHI KASEI Co., Ltd.; trade name, MX-072), copper iodide and potassium iodide were added in such amounts that the content of copper was 300 ppm and the content of iodine was 150 ppm. After the above components were dry blended by a Henschel mixer, the obtained blend was melt kneaded by using a twin screw extruder (a product of TOSHIBA KIKAI Co., Ltd.; TEM-35) at a set cylinder temperature of 280° C. to obtain pellets. From the obtained pellets, a test piece having a thickness of 1 mm for the tensile test was prepared by an injection molding machine (a product of TOSHIBA KIKAI Co., Ltd.; IS55FPA) at a set cylinder temperature of 290° C. The prepared test piece was left standing in an air oven at 150° C. for 1,000 hours, and then the tensile strength and the elongation were measured.

The results are shown in Table 2.

EXAMPLE 18

To a mixture containing 44% by weight of SPS, 50% by weight of a polyamide 66 (a product of UBE KOSAN Co., Ltd.; trade name, 2015B), and 6% by weight of the polyphenylene ether modified with maleic anhydride, copper iodide and potassium iodide were added in such amounts that the content of copper was 50 ppm and the content of iodine was 1,500 ppm. After the above components were dry blended by a Henschel mixer, the obtained blend was melt kneaded by using a twin screw extruder (a product of TOSHIBA KIKAI Co., Ltd.; TEM-35) at a set cylinder temperature of 280° C. while glass fiber (a product of ASAHI FIBER Co., Ltd.; 03JAFT2A) was added by side feeding to obtain pellets. From the obtained pellets, a test piece having a thickness of 3 mm for the tensile test was prepared by an injection molding machine (a product of TOSHIBA KIKAI Co., Ltd.; IS55FPA) at a set cylinder temperature of 290° C. The prepared test piece was left standing in an air oven at 160° C. for 1,000 hours, and then the tensile strength and the elongation were measured.

The results are shown in Table 2.

EXAMPLE 19

To a mixture containing 44% by weight of SPS, 50% by weight of a polyamide 66 (a product of UBE KOSAN Co., Ltd.; trade name, 2015B), and 6% by weight of the polyphenylene ether modified with maleic anhydride, copper iodide and potassium iodide were added in such amounts that the content of copper was 50 ppm and the content of iodine was 1,500 ppm. To 100 parts by weight of the total of the above components, 0.3 parts by weight of IRGANOX 1098 (a product of CIBA GEIGY Co., Ltd.) was added as the phenolic compound. After the above components were dry blended by a Henschel mixer, the obtained blend was melt kneaded by using a twin screw extruder (a product of TOSHIBA KIKAI Co., Ltd.; TEM-35) at a set cylinder temperature of 280° C. while glass fiber (a product of ASAHI FIBER Co., Ltd.; 03JAFT2A) was added by side feeding to obtain pellets. From the obtained pellets, a test piece having a thickness of 3 mm for the tensile test was prepared by an injection molding machine (a product of TOSHIBA KIKAI Co., Ltd.; IS55FPA) at a set cylinder temperature of 290° C. The prepared test piece was left standing in an air oven at 160° C. for 1,000 hours, and then the tensile strength and the elongation were measured.

The results are shown in Table 2.

EXAMPLE 20

To a mixture containing 44% by weight of SPS, 50% by weight of a polyamide 66 (a product of UBE KOSAN Co., Ltd.; trade name, 2015B), and 6% by weight of the polyphenylene ether modified with maleic anhydride, copper iodide and potassium iodide were added in such amounts that the content of copper was 50 ppm and the content of iodine was 1,500 ppm. To 100 parts by weight of the total of the above components, 0.3 parts by weight of IRGANOX 1010 (a product of CIBA GEIGY Co., Ltd.) as the phenolic compound and 0.3 parts by weight of SUMILIZER TP-D (a product of SUMITOMO KAGAKU Co., Ltd.) as the ester of thiodipropionic acid or the derivative thereof were added. After the components were dry blended by a Henschel mixer, the obtained blend was melt kneaded by using a twin screw extruder (a product of TOSHIBA KIKAI Co., Ltd.; TEM-35) at a set cylinder temperature of 280° C. while glass fiber (a product of ASAHI FIBER Co., Ltd.; 03JAFT2A) was added by side feeding to obtain pellets. From the obtained pellets, a test piece having a thickness of 3 mm for the tensile test was prepared by an injection molding machine (a product of TOSHIBA KIKAI Co., Ltd.; IS55FPA) at a set cylinder temperature of 290° C. The prepared test piece was left standing in an air oven at 160° C. for 1,000 hours, and then the tensile strength and the elongation were measured.

The results are shown in Table 2.

COMPARATIVE EXAMPLE 4

A mixture containing 44% by weight of SPS, 50% by weight of a polyamide 66 (a product of UBE KOSAN Co., Ltd.; trade name, 2015B), and 6% by weight of the polyphenylene ether modified with maleic anhydride was dry blended by a Henschel mixer. The obtained blend was melt kneaded by using a twin screw extruder (a product of TOSHIBA KIKAI Co., Ltd.; TEM-35) at a set cylinder temperature of 280° C. while glass fiber (a product of ASAHI FIBER Co., Ltd.; 03JAFT2A) was added by side feeding to obtain pellets. From the obtained pellets, a test piece having a thickness of 3 mm for the tensile test was prepared by an injection molding machine (a product of TOSHIBA KIKAI Co., Ltd.; IS55FPA) at a set cylinder temperature of 290° C. The prepared test piece was left standing in an air oven at 160° C. for 1,000 hours, and then the tensile strength and the elongation were measured.

The results are shown in Table 2.

COMPARATIVE EXAMPLE 5

To a mixture containing 44% by weight of SPS, 50% by weight of a polyamide 66 (a product of UBE KOSAN Co., Ltd.; trade name, 2015B), and 6% by weight of the polyphenylene ether modified with maleic anhydride, copper(I) chloride was added in such an amount that the content of copper was 50 ppm. After the components were dry blended by a Henschel mixer, the obtained blend was melt kneaded by using a twin screw extruder (a product of TOSHIBA KIKAI Co., Ltd.; TEM-35) at a set cylinder temperature of 280° C. while glass fiber (a product of ASAHI FIBER Co., Ltd.; 03JAFT2A) was added by side feeding to obtain pellets. From the obtained pellets, a test piece having a thickness of 3 mm for the tensile test was prepared by an injection molding machine (a product of TOSHIBA KIKAI Co., Ltd.; IS55FPA) at a set cylinder temperature of 290° C. The prepared test piece was left standing in an air oven at 160° C. for 1,000 hours, and then the tensile strength and the elongation were measured.

The results are shown in Table 2.

TABLE 1-1

| | (B) copper compound | | | | (C) phenolic compound | | (E) ester of thiodipropionic acid[4] |
|---|---|---|---|---|---|---|---|
| | type | content of Cu ppm | content of I ppm | Cu/I ratio by mol | type | amount part by wt. | part by wt. |
| Example | | | | | | | |
| 1 | Cu iodide | 50 | 1000 | 20 | — | — | — |
| 2 | Cu iodide | 50 | 1500 | 30 | — | — | — |
| 3 | Cu iodide | 150 | 1500 | 10 | — | — | — |
| 4 | Cu iodide | 300 | 1500 | 5 | — | — | — |
| 5 | Cu acetate | 50 | 1500 | 30 | — | — | — |
| 6 | Cu(I) chloride | 50 | 1500 | 30 | — | — | — |
| 7 | Cu(I) bromide | 50 | 1500 | 30 | — | — | — |
| 8 | Cu iodide | 50 | 1500 | 30 | 1) | 0.3 | — |
| 9 | Cu iodide | 50 | 1500 | 30 | 2) | 0.3 | — |
| 10 | Cu iodide | 50 | 1500 | 30 | 3) | 0.3 | — |
| 11 | Cu iodide | 50 | 1500 | 30 | 1) | 0.3 | 0.3 |
| 12 | Cu iodide | 50 | 1500 | 30 | 2) | 0.3 | 0.3 |
| 13 | Cu iodide | 50 | 1500 | 30 | 3) | 0.3 | 0.3 |

Notes:
[1] IRGANOX 1010
[2] ADEKASTAB AO-80
[3] IRGANOX 1098
[4] SUMILIZER TP-D

TABLE 1-2

| | (B) copper compound | | content of I ppm | Cu/I ratio by mol | (C) phenolic compound | | (E) ester of thiodipropionic acid[4] part by wt. |
|---|---|---|---|---|---|---|---|
| | type | content of Cu ppm | | | type | amount part by wt. | |
| Example | | | | | | | |
| 14 | Cu iodide | 50 | 1500 | 30 | — | — | — |
| 15 | Cu iodide | 50 | 1500 | 30 | — | — | — |
| 16 | Cu iodide | 50 | 1500 | 30 | — | — | — |
| 17 | Cu iodide | 50 | 1500 | 30 | 1) | 0.3 | 0.3 |
| Comparative Example | | | | | | | |
| 1 | — | — | — | — | — | — | — |
| 2 | Cu(I) chloride | 50 | — | — | — | — | — |
| 3 | Cu iodide | 300 | 150 | 0.5 | — | — | — |
| Example | | | | | | | |
| 18 | Cu iodide | 50 | 1500 | 30 | — | — | — |
| 19 | Cu iodide | 50 | 1500 | 30 | 3) | 0.3 | — |
| 20 | Cu iodide | 50 | 1500 | 30 | 1) | 0.3 | 0.3 |
| Comparative Example | | | | | | | |
| 4 | — | — | — | — | — | — | — |
| 5 | Cu(I) chloride | 50 | — | — | — | — | — |

Notes:
[1)]IRGANOX 1010
[3)]IRGANOX 1098
[4)]SUMILIZER TP-D

TABLE 2-1

| | (F) copper inhibitor | | (G) GF filled | properties after molding | | change in color[5] | resistance to heat aging | | |
|---|---|---|---|---|---|---|---|---|---|
| | type | amount part by wt. | amount % by wt. | tensile strength MPa | elongation mm | after absorption of water[4] | tensile strength MPa | elongation mm | change in color[5] |
| Example | | | | | | | | | |
| 1 | — | — | — | 59 | 27 | ○ | 57 | 10 | Δ |
| 2 | — | — | — | 61 | 25 | ○ | 60 | 11 | Δ |
| 3 | — | — | — | 58 | 26 | ○ | 59 | 14 | Δ |
| 4 | — | — | — | 59 | 27 | ○ | 57 | 15 | Δ |
| 5 | — | — | — | 60 | 26 | ○ | 61 | 9 | Δ |
| 6 | — | — | — | 59 | 25 | ○ | 58 | 10 | Δ |
| 7 | — | — | — | 59 | 27 | ○ | 60 | 10 | Δ |
| 8 | — | — | — | 61 | 27 | ○ | 60 | 16 | Δ |
| 9 | — | — | — | 61 | 26 | ○ | 60 | 16 | Δ |
| 10 | — | — | — | 60 | 27 | ○ | 57 | 19 | Δ |
| 11 | — | — | — | 59 | 27 | ○ | 60 | 24 | Δ |
| 12 | — | — | — | 59 | 25 | ○ | 60 | 23 | Δ |
| 13 | — | — | — | 61 | 26 | ○ | 59 | 24 | Δ |

Notes:
[4)]Test conducted by dipping into water at 100° C. for 12 hours.
[5)]⊙: no change in color; ○: slight change; Δ: change in color; x: significant change in color

TABLE 2-2

|  | (F) copper inhibitor | | (G) GF filled | properties after molding | | change in color[5] | resistance to heat aging | | change in color[5] |
|---|---|---|---|---|---|---|---|---|---|
|  | type | amount part by wt. | amount % by wt. | tensile strength MPa | elong- ation mm | after absorption of water[4] | tensile strength MPa | elong- ation mm | |
| Example | | | | | | | | | |
| 14 | [6] | 0.3 | — | 59 | 26 | ○ | 61 | 22 | ○ |
| 15 | [7] | 0.3 | — | 60 | 26 | ⊙ | 61 | 12 | ○ |
| 16 | [8] | 0.3 | — | 59 | 25 | ⊙ | 60 | 12 | ○ |
| 17 | [6] | 0.3 | — | 59 | 25 | ⊙ | 60 | 24 | ⊙ |
| Comparative Example | | | | | | | | | |
| 1 | — | — | — | 61 | 27 | ⊙ | 26 | 1.1 | × |
| 2 | — | — | — | 58 | 27 | × | 40 | 1.7 | × |
| 3 | — | — | — | 61 | 26 | × | 48 | 3.9 | × |
| Example | | | | | | | | | |
| 18 | — | — | 30 | 175 | 3.0 | ○ | 159 | 2.6 | Δ |
| 19 | — | — | 30 | 173 | 3.1 | ○ | 167 | 2.8 | ○ |
| 20 | — | — | 30 | 176 | 3.0 | ○ | 172 | 2.9 | ○ |
| Comparative Example | | | | | | | | | |
| 4 | — | — | 30 | 175 | 3.0 | ⊙ | 114 | 1.7 | × |
| 5 | — | — | 30 | 174 | 3.0 | × | 140 | 1.9 | × |

Notes:
[4] Test conducted by dipping into water at 100° C. for 12 hours.
[5] ⊙: no change in color; ○: slight change in color; Δ: change in color; ×: significant change in color
[6] IRGANOX MD1024
[7] ADEKASTAB CDA-6
[8] NAUGARD XL-1

We claim:

1. A composition comprising:

(A) a styrenic polymer composition containing
      (a) 1 to 99% by weight of a styrenic polymer having syndiotactic configuration, selected from the group consisting of polystyrene, poly(alkylstyrene), poly(halogenated styrene), poly(halogenated alkylstyrene), poly(alkoxystyrene), poly(vinylbenzoic acid ester), a hydrogenated derivative of these polymer, a mixture of these polymers and a copolymer containing constituting units of these polymers as the main components;
      (b) 1 to 99% by weight of a polyamide resin,
      (c) 0.1 to 10% by weight of a compatibilizer which is compatible with component (a) and has a polar group reactive with component (b), and
      (d) 0 to 50% by weight of an elastomer selected from the group consisting of a rubbery elastomer, a modified rubbery elastomer and a mixture thereof; and (B) a copper compound in such an amount that content of copper is 1 to 3000 ppm and an iodine compound in such an amount that ratio by mnol of copper to iodine is 1 to 50, the total content of the copper compound and the iodine compound being 5 to 50,000 ppm.

2. The composition according to claim 1 wherein the composition additionally comprises (C) 0.005 to 5.0 parts by weight, per 100 parts by weight of component (A), of a phenolic compound represented by the following general formula (I):

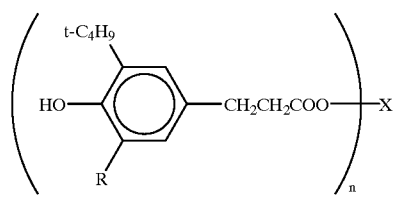

wherein R represents methyl group or t-butyl group, X represents a residue group obtained by removing n hydroxy groups from an alcohol having 1 to 4 hydroxyl groups, and n represents an integer of 1 to 4.

3. A polystyrenic resin composition according to claim 1 wherein the polystyrenic resin composition additionally comprises (D) 0.005 to 5.0 parts by weight of N,N'-hexamethylenebis(3,5-di-t-butyl-4-hydroxy-hydrocinnamide) per 100 parts by weight of component (A).

4. A polystyrenic resin composition according to claim 2 wherein the polystyrenic resin composition additionally comprises (D) 0.005 to 5.0 parts by weight of N,N'-hexamethylenebis(3,5-di-t-butyl-4-hydroxy-hydrocinnamide) per 100 parts by weight of component (A).

5. A polystyrenic resin composition according to claim 1 wherein the polystyrenic resin composition additionally comprises (E) 0.005 to 5.0 parts by weight of an ester of thiodipropionic acid or a derivative thereof per 100 parts by weight of component (A).

6. A polystyrenic resin composition according to claim 2 wherein the polystyrenic resin composition additionally comprises (E) 0.005 to 5.0 parts by weight of an ester of thiodipropionic acid or a derivative thereof per 100 parts by weight of component (A).

7. A polystyrenic resin composition according to claim 3 wherein the polystyrenic resin composition additionally comprises (E) 0.005 to 5.0 parts by weight of an ester of thiodipropiojnic acid or a derivative thereof per 100 parts by weight of component (A).

8. A polystyrenic resin composition according to claim 4 wherein the polystyrenic resin composition additionally comprises (E) 0.005 to 5.0 parts by weight of an ester of thiodipropionic acid or a derivative thereof per 100 parts by weight of component (A).

9. A polystyrenic resin composition according to claim 1 wherein the polystyrenic resin composition additionally comprises (F) 0.005 to 5.0 parts by weight of a copper inhibitor per 100 parts by weight of component (A).

10. A polystyrenic resin composition according to claim 2 wherein the polystyrenic resin composition additionally comprises (F) 0.005 to 5.0 parts by weight of a copper inhibitor per 100 parts by weight of component (A).

11. A polystyrenic resin composition according to claim 3 wherein the polystyrenic resin composition additionally comprises (F) 0.005 to 5.0 parts by weight of a copper inhibitor per 100 parts by weight of component (A).

12. A polystyrenic resin composition according to claim 4 wherein the polystyrenic resin composition additionally comprises (F) 0.005 to 5.0 parts by weight of a copper inhibitor per 100 parts by weight of component (A).

13. A polystyrenic resin composition according to claim 5 wherein the polystyrenic resin composition additionally comprises (F) 0.005 to 5.0 parts by weight of a copper inhibitor per 100 parts by weight of component (A).

14. A polystyrenic resin composition according to claim 6 wherein the polystyrenic resin composition additionally comprises (F) 0.005 to 5.0 parts by weight of a copper inhibitor per 100 parts by weight of component (A).

15. A polystyrenic resin composition according to claim 7 wherein the polystyrenic resin composition additionally comprises (F) 0.005 to 5.0 parts by weight of a copper inhibitor per 100 parts by weight of component (A).

16. A polystyrenic resin composition according to claim 8 wherein the polystyrenic resin composition additionally comprises (F) 0.005 to 5.0 parts by weight of a copper inhibitor per 100 parts by weight of component (A).

17. A polystyrenic resin composition according to claim 1 wherein the polystyrenic resin composition additionally comprises (G) 1 to 350 parts by weight of inorganic filler per 100 parts by weight of the polystyrenic resin composition excluding the inorganic filler of component (G).

18. A molded product prepared from a polystyrenic resin composition described in claim 1.

* * * * *